(12) United States Patent
Liu et al.

(10) Patent No.: US 10,740,640 B2
(45) Date of Patent: Aug. 11, 2020

(54) IMAGE PROCESSING METHOD AND PROCESSING DEVICE

(71) Applicant: Alibaba Group Holding Limited, Grand Cayman (KY)

(72) Inventors: Yu Liu, Beijing (CN); Ruitao Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 118 days.

(21) Appl. No.: 16/157,055

(22) Filed: Oct. 10, 2018

(65) Prior Publication Data

US 2019/0108411 A1    Apr. 11, 2019

(30) Foreign Application Priority Data

Oct. 11, 2017    (CN) .......................... 2017 1 0941265

(51) Int. Cl.
| | | |
|---|---|---|
| *G06K 9/32* | (2006.01) | |
| *G06K 9/42* | (2006.01) | |
| *G06K 9/62* | (2006.01) | |
| *G06F 16/55* | (2019.01) | |
| *G06F 16/583* | (2019.01) | |
| *G06K 9/46* | (2006.01) | |

(52) U.S. Cl.
CPC .......... *G06K 9/3233* (2013.01); *G06F 16/55* (2019.01); *G06F 16/5838* (2019.01); *G06K 9/42* (2013.01); *G06K 9/4642* (2013.01); *G06K 9/6256* (2013.01); *G06K 9/6262* (2013.01)

(58) Field of Classification Search
CPC ...... G06K 9/3233; G06K 9/42; G06K 9/4642; G06K 9/6256; G06K 9/6262; G06K 9/4628; G06K 9/6254; G06K 9/6271; G06F 17/30256; G06F 16/55; G06F 16/5838

See application file for complete search history.

(56) References Cited

U.S. PATENT DOCUMENTS

| | | | |
|---|---|---|---|
| 5,274,714 A | 12/1993 | Hutcheson et al. | |
| 5,631,984 A * | 5/1997 | Graf | G06K 9/00449 |
| | | | 382/317 |
| 9,576,335 B2 * | 2/2017 | Niem | G06T 3/00 |

(Continued)

OTHER PUBLICATIONS

Baeza-Yates et al.("Modeling user search behavior," Third Latin American Web Congress, Oct. 31-Nov. 2, 2005) (Year: 2005).*

(Continued)

*Primary Examiner* — Yubin Hung
(74) *Attorney, Agent, or Firm* — Lee & Hayes, P.C.

(57) ABSTRACT

A method including normalizing an original image into an intermediate image, the intermediate image including multiple local blocks; calculating image feature data of the local blocks; calculating weight distribution data corresponding to the local blocks in the intermediate image according to the image feature data, the weight distribution data representing a degree of possibility that the local blocks include part or all of an object; and determining a location area of the object in the original image based on the weight distribution data obtained by calculation. By using the technical solutions in this present disclosure, an object in an image is localized rapidly and efficiently, and a subject area is determined, thereby saving a large amount of work for manually labeling images.

20 Claims, 9 Drawing Sheets

(56) References Cited

U.S. PATENT DOCUMENTS

| | | | |
|---|---|---|---|
| 2003/0095723 A1 | 5/2003 | Ishizaka et al. | |
| 2005/0232466 A1* | 10/2005 | Kampchen | G06T 7/269 |
| | | | 382/103 |
| 2006/0257048 A1* | 11/2006 | Lin | G06K 9/00711 |
| | | | 382/276 |
| 2013/0246456 A1* | 9/2013 | Sun | G06Q 30/0256 |
| | | | 707/769 |
| 2015/0142954 A1 | 5/2015 | Bayen et al. | |
| 2015/0269449 A1 | 9/2015 | Kosaki | |
| 2016/0041985 A1* | 2/2016 | Manterach | G06F 16/24578 |
| | | | 707/727 |
| 2016/0132749 A1* | 5/2016 | Smyth | G06K 9/3233 |
| 2016/0196639 A1* | 7/2016 | Shin | G06K 9/6202 |
| | | | 382/201 |
| 2016/0232418 A1* | 8/2016 | Inoshita | G06K 9/3233 |
| 2017/0228659 A1* | 8/2017 | Lin | G06N 5/04 |

OTHER PUBLICATIONS

Atreja et al. ("Learning Relevance' as a Service for Improving Search Results in Technical Discussion Forums," IEEE International Conference on Web Services, Jun. 25-30, 2017) (Year: 2017).*

Vnenk et al. ("Searcher's Activity in Standalone and Web Applications as a Source for Search Query Expansion," European Network Intelligence Conference, Sep. 29-30, 2014) (Year: 2014).*

The PCT Invitation to Pay Additional Fees dated Nov. 26, 2018 for PCT application No. PCT/US18/55303, 2 pages.

The PCT Search Report and Written Opinion dated Jan. 22, 2019 for PCT Application No. PCT/US2018/055303, 10 pages.

* cited by examiner

IMAGE PROCESSING METHOD AND PROCESSING DEVICE

CROSS REFERENCE TO RELATED PATENT APPLICATIONS

This application claims priority to and is a continuation of Chinese Patent Application No. 201710941265.5 filed on 11 Oct. 2017 and entitled "IMAGE PROCESSING METHOD AND PROCESSING DEVICE," which is incorporated herein by reference in its entirety.

TECHNICAL FIELD

The present disclosure relates to the field of image data processing technologies, and, more particularly, to image processing methods and processing devices.

BACKGROUND

With the continuous development of technologies such as the Internet and e-businesses, more and more image data need to be processed. Effective pre-processing of images is the foundation for subsequent tasks such as image classification and feature extraction. It is an important pre-processing measure to localize a location area of an image subject. The processing of image subject localization generally refers to identifying an object in an image, localizing the object in the image, and then determining a subject area where the object in the image is located. Therefore, interference of a background area with subsequent image processing may be reduced, thus improving the precision and performance of related image processing algorithms.

Image object localization methods under the conventional techniques mainly include a full-supervision-based object detection method and some other weak-supervision object detection algorithms. However, in actual applications of these algorithms, images need to be labeled manually, and model training with a relatively large computational load and a relatively complex process needs to be performed. For example, in the weak-supervision algorithm, image category information needs to be labeled manually. In the full-supervision object detection algorithm, in addition to category information, object bounding box data of each object in the image is further needed. Therefore, a larger amount of data needs to be labeled manually. As there are massive data at the Internet currently, the amount of image data to be processed is generally tremendous. The method of implementing image subject localization by marking tremendous image data manually cannot meet the requirement of rapid image data processing.

Therefore, a solution that may localize an object in an image more rapidly and efficiently is needed urgently in the industry.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides image processing methods and devices, which localize an object in an image rapidly and efficiently and determine a subject area of the image, thus saving a large amount of work for manual labeling and data processing on images.

An image object localization method, including:
normalizing an original image into an intermediate image, the intermediate image including multiple local blocks;
calculating image feature data of the local blocks;
calculating weight distribution data corresponding to the local blocks in the intermediate image according to the image feature data, the weight distribution data representing a degree of possibility that the local blocks include part or all of an object; and
determining a location area of the object in the original image based on the weight distribution data obtained by calculation.

A processing device, including one or more processors and computer readable media configured to store computer-readable instructions, the processor implementing the following operations when executing the instruction:
normalizing an original image into an intermediate image, the intermediate image including multiple local blocks;
calculating image feature data of the local blocks;
calculating weight distribution data corresponding to the local blocks in the intermediate image according to the image feature data, the weight distribution data representing a degree of possibility that the local blocks include part or all of an object; and
determining a location area of the object in the original image based on the weight distribution data obtained by calculation.

An image processing method, including:
acquiring an image including multiple local blocks;
calculating image feature data of the local blocks; and
processing the image feature data by using an attention model, and outputting weight distribution data corresponding to the local blocks, the weight distribution data representing a degree of possibility that the local blocks include part or all of an object.

One or more computer readable media storing thereon computer-readable instructions, when executed by one or more processors, cause the one or more processors to the steps of the foregoing method.

An image processing method and a processing device provided by the example embodiments of this present disclosure may normalize an original image and then extract and calculate local feature data to acquire weight distribution data of each local block. A weight in the weight distribution data may represent a degree of possibility that a corresponding local block belongs to an object area in the original image. After the weight distribution data is acquired, a location area of an object in the original image may be located by using the weight distribution data, and an object bounding box is marked in the original image. In the processing of localizing a location area of an object in an image, the implementation solution provided in this present disclosure saves a large amount of work for manual labeling and data processing on images, thus localizing an object in an image rapidly and efficiently.

BRIEF DESCRIPTION OF THE DRAWINGS

To describe the technical solutions in the example embodiments of the present disclosure more clearly, the drawings used in the example embodiments are briefly introduced. The drawings in the following description merely represent some example embodiments of the present disclosure, and those of ordinary skill in the art may further obtain other drawings according to these drawings without creative efforts.

FIG. 5 is a schematic diagram of weight distribution data obtained by performing calculation on the original image in FIG. 4 in the present disclosure;

DETAILED DESCRIPTION

Figure 1:
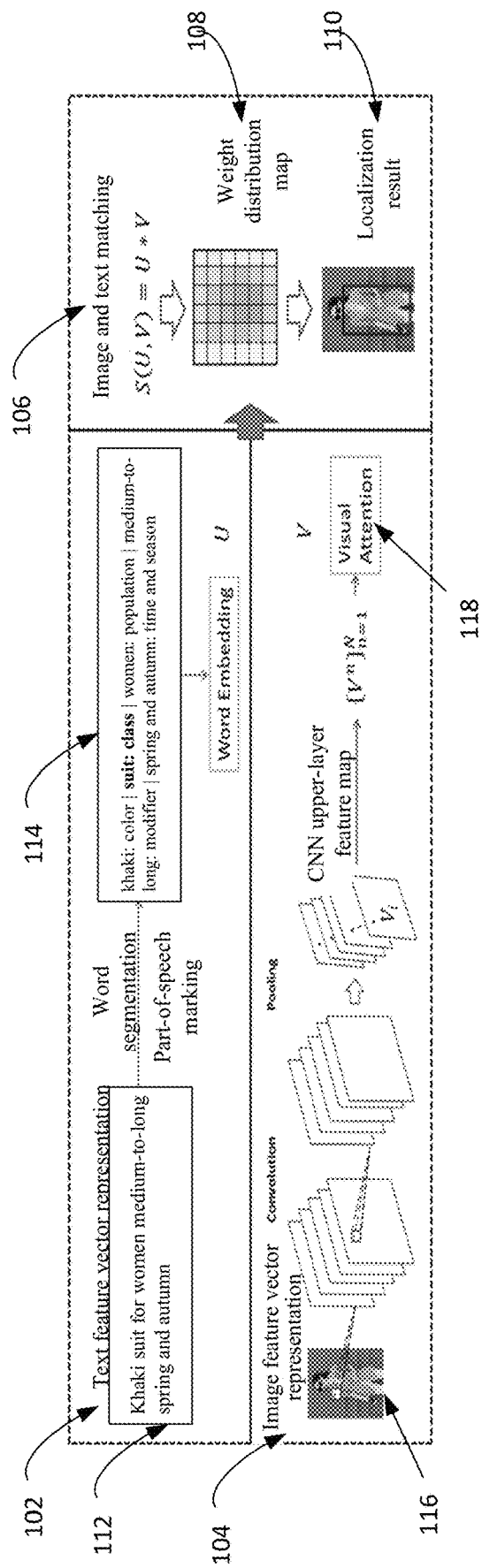
FIG. 1 is a schematic diagram of a processing procedure of an implementation solution in this present disclosure.

In order to enable those skilled in the art to better understand the technical solutions in this present disclosure, the technical solutions in the example embodiments of this present disclosure are described clearly and completely in the following with reference to the accompanying drawings in the example embodiments in this present disclosure. Apparently, the described example embodiments merely represent some, rather than all, of the embodiments of this present disclosure. Based on one or more example embodiments in this present disclosure, all other embodiments obtained by those of ordinary skill in the art without creative efforts should belong to the protection scope of the present disclosure.

Many existing online product purchasing services not only provide a product search box that may utilize text matching, but also provide solutions that implement product search by using multimedia such as an image. After a user takes a product image, features may be extracted from the product image by using a convolutional neural network (CNN), then related products are searched for, and product search results are returned to the user. The process of extracting features from the product image may be directly carried out on the original image. If an object in the product image is outlined first by means of object localization and then features are extracted by using a CNN, feature data obtained in such a manner is more concentrated on the object in the image, hence reducing interference from a background area. As such, a more prominent feature expressing capability may be achieved, and commodity retrieval precision may be effectively improved. In the present disclosure, a subject of an image generally refers to an object highlighted in the image. The subject in the image generally occupies a relatively large area or a particular location in the image, or has a significant visual contrast with the background. In some implementation scenarios, one image may include multiple objects; one or more of the objects may be used as a subject of the image, and a subject area including one or more objects may be formed. In some example embodiments of the present disclosure, when an image includes multiple main objects, location areas of the multiple objects may be localized. For example, if an image includes a standing lady and a leather bag in the hand of the lady, a result outputted during localization of object areas in the image may include rectangular areas of two objects, i.e., the lady and the leather bag in the hand.

In the conventional full-supervision or weak-supervision based image object detection methods, a large amount of manually marked data is required to train a network model, and the training process is complex. For example, in a common state-of-the-art weak supervision algorithm, a basic CNN generally needs to be retrained. In such a manner, network layers of the used basic CNN need to be modified, and then the basic CNN is retrained by using manually labeled category information, which requires a large computational load.

The image object localization method provided by the present disclosure may learn and train a matching relationship between text feature data of an image and image feature data representing a local feature of the image in advance to obtain stable and usable attention model parameters. During processing of a to-be-identified image, a weight distribution of different image areas may be obtained by calculating image feature data of the to-be-identified image, and then an object in the to-be-processed image may be localized by using data information of the weight distribution. The model parameters during calculation of a main image weight distribution may be acquired through sample training. In the implementation solution provided by the present disclosure, label information of images used in sample training may be obtained without the conventional method of manually marking original images directly. In an example embodiment provided by the present disclosure, the used training data may be data information acquired from search texts-clicked images of users in a search engine.

In implementations of the present disclosure, data used in attention model parameter training comes from user search and click behavior data in an actual scenario, for example, a product search click log of online product purchasing. In some online product search applications, a user may carry out retrieval by using a search text to obtain product images. When the user clicks a returned image in retrieval, it may indicate to some degree that the image clicked by the user is as expected by the user, or it may be interpreted as that the image clicked by the user has a high degree of matching with the search text inputted by the user in the search engine. In such a case, all or some of words of the search text inputted by the user may be used as a tag of the image clicked by the user. In a specific example, for example, a search text inputted by a user is "khaki suit," the user clicks a picture P1 in returned clothes search results, and the search text of the user and the clicked product picture P1 may be recorded. The search text "khaki suit" and the picture P1 may be used as a group of training data, wherein "khaki suit" is used as text description information of the picture P1. Certainly, "khaki suit" may be further divided into a "khaki" tag representing a color and a "suit" tag representing a commodity category. The training data here may include a search text and an image clicked based on the search text. As the search text and the clicked image are search and click behavior data of the user, they are more in line with an actual image-text matching relationship. Moreover, in an actual implementation process, data of multiple clicks will be selected. Therefore, the authenticity and effectiveness of the training data may be guaranteed, and precision of parameters in the training may be improved, thus improving the localization precision of an object location area in the entire image. Therefore, in an implementation solution of the present disclosure, the attention model used in the following may be trained by using user search behavior data.

In the implementation solution of the present disclosure, a category label of an image may be determined by using the foregoing training data. Among deep learning algorithms, one learning algorithm is Attention model (AM), which simulates a human brain attention model. For example, when looking at a painting, we may see the entire painting. However, as we observing details of the painting, our eyes only focus on a small part of the painting. In this case, the human brain mainly pays attention to this small block of pattern. In other words, the human brain pays weighted attention rather than equal attention to different parts of the entire painting. In the present disclosure, by using the algorithm thought of the attention model in combination with a category label to which the entire image belongs, different weights may be assigned to different local areas in the image, so as to represent a degree of correlation (or referred to as relevancy) between a local block in the image and a category label (text feature data) of an object in an original image; the relevancy may be expressed by using the weight. The value of the weight here may represent a probability that the corresponding local block includes or belongs to an object area in the original image. In one solution of the present disclosure, a to-be-processed original image may be normalized into an intermediate image; image feature data of each local block in the intermediate image is calculated; then the image feature data is processed by using an attention model, and weight distribution data corresponding to the local blocks of the intermediate image is outputted. A location area of an object in the original image may be determined by using the weight distribution data. In this solution, an object localization model is trained based on user behavior data in a search engine and a visual attention mechanism. A schematic processing flowchart for implementing the solution may be as shown in FIG. 1, which may include text feature vector representation 102, image feature vector representation 104, image and text matching 106, calculation of a weight distribution map 108 of an image, and calculation of an object localization result 110 according to the weight distribution map 108.

In the example of FIG. 1, word segmentation and part-of-speech marking are applied to a text 112 "Khaki suit for women medium-to-long spring and autumn" to obtain text feature data 114 such as "khaki: color|suit: class| women: population medium-to-long: modifier spring and autumn: time and season." Then word embedding is applied to the text feature data to obtain the text vector U.

Image data 116 may be present in a three-dimensional form at each convolutional layer, which may be regarded as multiple two-dimensional pictures superposed together, wherein each two-dimensional picture is referred to as a feature map. At an input layer, a gray picture has only one feature map; a color picture generally has 3 feature maps (red, green, and blue). There are several convolution kernels between layers; by performing a convolution operation between each feature map at an upper layer and each convolution kernel, such as CNN upper-layer feature map, a feature map of a next layer will be generated. Finally, an image vector representation of Visual Attention 118 may be outputted.

Through the image and text matching 106, the weight distribution map 108 of the image is calculated. The object localization result 110 of an object in the image is calculated according to the weight distribution map 108.

The image object localization method in the present disclosure is described below with reference to several specific scenarios. However, it should be noted that the specific scenarios are merely used for illustrating the present disclosure better, and do not improperly limit the present disclosure. As such, the weight distribution data may be obtained by calculating weight values of all the local blocks in the original image.

Figure 2:
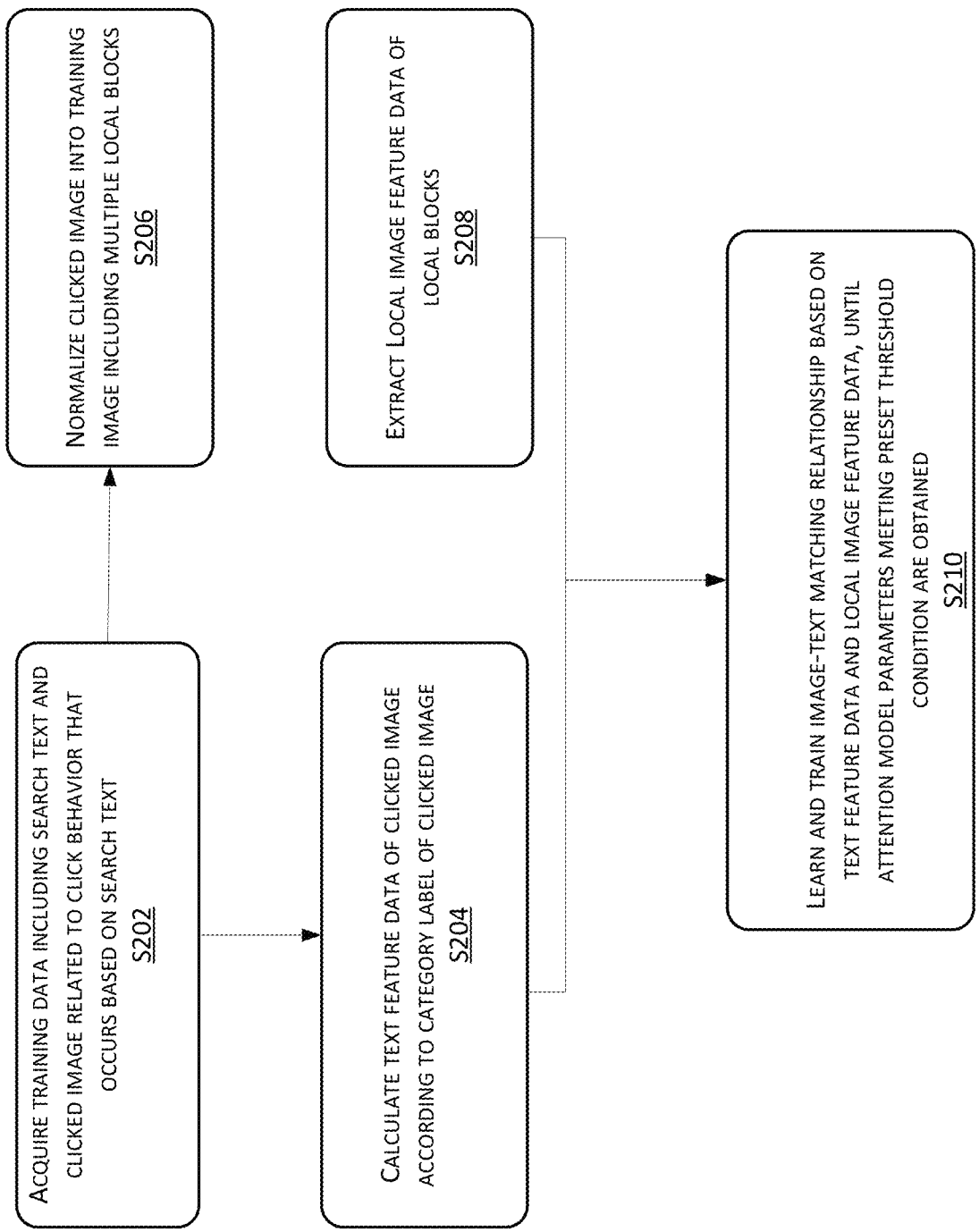
FIG. 2 is a schematic flowchart of an example embodiment of attention model construction in the method according to the present disclosure.

FIG. 2 is a schematic flowchart of an example embodiment of attention model construction in the method according to the present disclosure. As shown in FIG. 2, in an implementation manner, the attention model may be constructed in the following manner:

S202: Training data is acquired, the training data including: search text and a clicked image related to a click behavior that occurs based on the search text.

The used training data may come from user search and click behavior data in an actual scenario, for example, a product search and click log recorded in online product purchasing.

S204: Text feature data of the clicked image is calculated according to a category label of the clicked image. The category label may be obtained based on a search text corresponding to the clicked image.

Word segmentation and part-of-speech marking may be performed on a retrieval text inputted by a user. A target to be localized in this implementation method is an object part in an image. Therefore, a word that represents a category label to which the image belongs in the part-of-speech marking may be retained, for example, a word that represents a "class" to which the image belongs; words belong to other parts of speech, such as "color" and "brand", are unrelated to object localization and may be discarded.

The foregoing text feature data may be of a conventional data type in algorithms used in some example embodiments. During image data processing, vector data may better facilitate processing such as image encoding, conversion and comparison. Therefore, in an implementation manner of the present disclosure, the text feature data may include: a dense vector (also referred to as dense vector) into which data information corresponding to the category label is converted through word embedding. The dense vector generally means that the value of the vector is a common Double array, e.g., the vector (1.0,0.0,1.0,3.0) expressed in a dense format is [1.0,0.0,1.0,3.0]. The dense vector may reflect semantic information of the "class" word, and may be compared with an image encoding vector easily.

Figure 9:
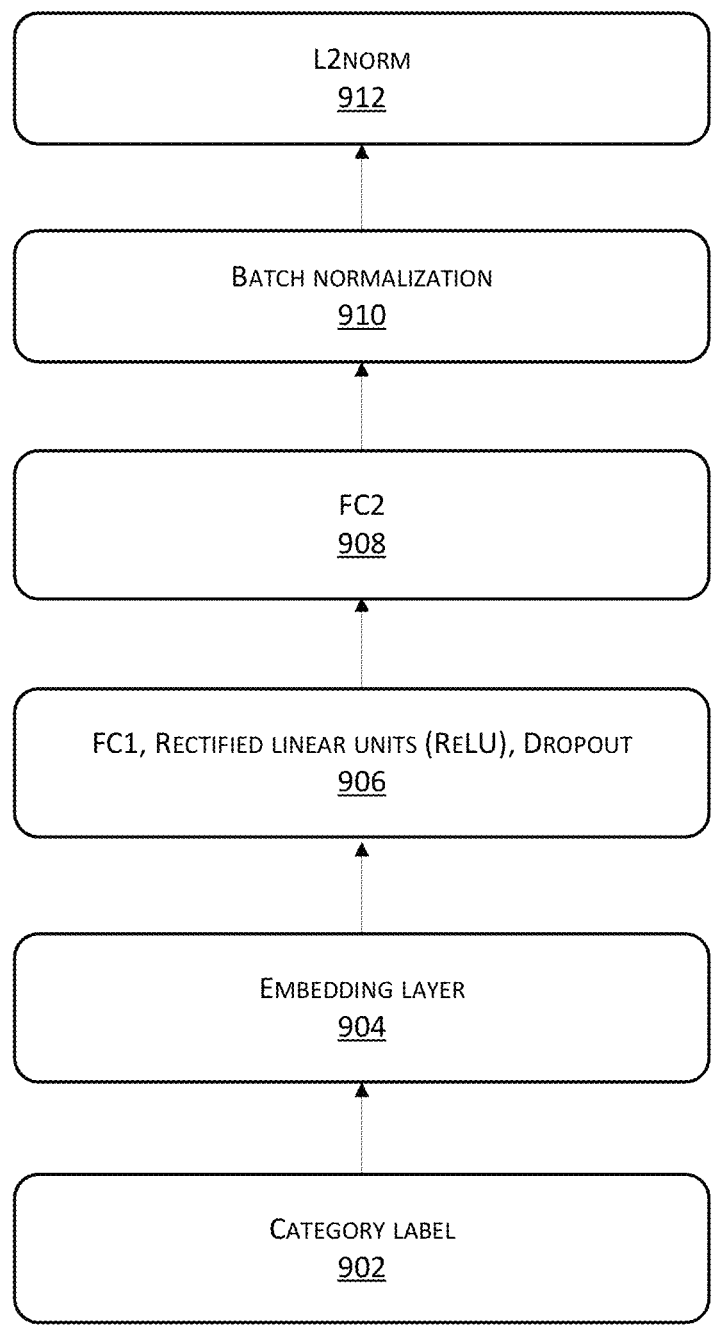
FIG. 9 is a schematic processing flowchart of an example embodiment of generation of a text feature vector according to the present disclosure.

The category label of the image may be converted into a dense vector. A specific implementation manner is as shown in FIG. 9. FIG. 9 is a schematic processing flowchart of generation of a text feature vector according to the present disclosure. Each category label 902 may be converted into a vector through one-hot encoding. Considering that one-hot encoding vectors are generally sparse long vectors, one-hot codes may be converted into lower-dimension dense vectors through an embedding layer 904 to facilitate processing, and a formed vector sequence is used as text feature data corresponding to the label. A text network may employ a two-layer fully connected structure, and other non-linear computation layers are added to enhance a text feature expression capability, so as to obtain text feature data of a category label corresponding to a certain image. That is, the category label is finally converted into a fixed-length real number vector. For example, "suit" in FIG. 1 is converted into a text feature vector through a label encoding model.

The text feature vector may reflect an original semantic meaning, so as to facilitate comparison with the image feature vector.

The image may be processed through machine learning techniques such as CNN. The first fully connected layer (FC1), the rectified linear units (ReLU), dropout techniques at 906 may be applied to obtain the second fully connected layer (FC2) 908 and so on. At 910, batch normalization is applied. Thus, the image feature vector of the image is obtained from the machine learning.

The L2norm 912 calculates the Euclidean distance between the text feature vector and the image feature vector. A smaller Euclidean distance indicates higher relevancy between the two vectors, and a greater Euclidean distance indicates lower relevancy between the two vectors. Therefore, during model training, the Euclidean distance may be used as a training target. Correspondingly, during determination of relevancy, the text feature vector and the image feature vector may be subject to L2norm processing, and the image-text relevancy may be determined based on the Euclidean distance.

S206: The clicked image is normalized into a training image, the training image including multiple local blocks.

Generally, in a training process, an original image may be normalized into an intermediate image of a predetermined size, so as to adapt to an algorithm model and improve a processing speed. The image normalization processing generally refers to a processing procedure of performing a series of standard processing and transformations on an image to transform the image into an image in a fixed standard form. The image in the standard form may be referred to as a normalized image, and may be referred to as an intermediate image in the present disclosure. The image normalization mainly refers to searching for a group of parameters by using an invariant moment of an image to eliminate effects of other transformation functions on image transformation, and converting the to-be-processed original image into an image in a corresponding unique standard form (the image in the standard form has a characteristic of being invariant in affine transformations such as translation, rotation, and scaling). In this example embodiment, the image normalization processing on the clicked image is equivalent to scaling the image to a fixed size (such as 224*224 pixels) while still retaining image content information in the original image.

S208: Local image feature data of the local blocks is extracted.

The local image feature data in the foregoing model training may be of a conventional data type in algorithms used in some example embodiments. During image data processing, vector data may better facilitate processing such as image encoding, conversion and comparison. Therefore, in an implementation manner of the present disclosure, the local image feature data includes: an image feature vector that is outputted after image feature extraction is performed on the image through a neural network model.

The local image feature data may be extracted by using various processing algorithms, for example, a Scale-invariant feature transform (SIFT) algorithm, an edge direction histogram method, and so on. In an example embodiment of the present disclosure, ResNet-152 may be used as the neural network model for image feature extraction, and an original image is uniformly normalized into an image with a preset pixel value (such as 224×224 pixels), the normalized image is used as an input, and then a feature at a res5c layer is extracted as a network output. The length of an outputted feature vector has 2048 dimensions. Based on the neural network model, a final image feature vector that may reflect image content may be obtained by carrying out transfer learning through non-linear transformation. As shown in FIG. 1, in the process of processing using the CNN, image data may be present in a three-dimensional form at each convolutional layer, which may be regarded as multiple two-dimensional pictures superposed together, wherein each two-dimensional picture is referred to as a feature map. At an input layer, a gray picture has only one feature map; a color picture generally has 3 feature maps (red, green, and blue). There are several convolution kernels between layers; by performing a convolution operation between each feature map at an upper layer and each convolution kernel, a feature map of a next layer will be generated. Finally, an image vector representation of Visual Attention may be outputted.

S210: An image-text matching relationship is learned and trained based on the text feature data and the local image feature data, until attention model parameters meeting a preset threshold condition are obtained.

The attention model used in this example embodiment may be trained offline. The attention model may be first trained offline by using training data, and then used online after the training is completed. The present disclosure does not exclude a manner of training the attention model online. If a computer has sufficient capacity, the attention model may be trained online, and the trained attention model may be used online synchronously to localize an object area position in a to-be-processed image.

In an example embodiment, a distribution of probability that each local block outputted by the attention model belongs to part or all of an object region may be shown as follows:

$$\alpha_i^n = \text{Sigmoid}(h_i^n)$$

wherein $$h_i^n = \sigma(W_v V_i^n) \odot \sigma\left(W_0 \sigma\left(P^{(0)} \sum_{n=1}^{N} V_i^n\right)\right)$$

In the foregoing formula, $(V_i^0 = \sigma(P^{(0)} \Sigma_{n=1}^{N} V_i^n))$ denotes an initial overall image feature representation, $W_v$, $W_0$, P, $P^{(0)}$ matrix parameters are all obtained through training and learning; $\sigma$ may be calculated by using a ReLU or Tan H function. A feature vector corresponding to the $i^{th}$ image is denoted as $V_i$, the value of i ranges from 1 to n, n is the number of local blocks in the intermediate image, and a greater value of $\alpha^n$ generally indicates a higher probability that the local block belongs to the object area location in the image. Values of the parameters such as $W_v$, $W_0$, P, and $P^{(0)}$ are the target of the matching relationship learning. Object localization in an image may be implemented by using these parameters after the training is completed.

In an example embodiment, the aforementioned training data acquired from search texts-clicked images of users in a search engine may be used during model training. The training and construction process of the attention model mainly includes selecting a model framework structure, then carrying out learning through iterative calculations, and optimizing matrix parameters in the model, until the matrix parameters meet a preset threshold condition of image data processing. In an example embodiment of the image object localization method provided by the present disclosure, recorded search texts of users in a search engine and recorded images clicked based on the search texts may be used as training data, and matrix parameters to be determined in the attention model may be obtained through learning and training of an image-text matching relationship. Object localization in an image may be implemented by using these parameters after the training is completed.

In the foregoing description, an implementation manner of learning and training an image-text matching relationship based on the text feature data and the image feature data may specifically include: selecting an algorithm for measuring a degree of similarity between different data sets or a self-defined processing manner to implement representing, by using one or more types of data information, a probability value that a certain local block belongs to a category label of a sample image in the training data. In an example embodiment of the method provided by the present disclosure, in the model parameter learning and training process of the image-text matching relationship:

Relevancy between the local block and the category label may be represented by using a result of an inner product operation between the text feature data and the local image feature data; and a value of a designated matrix parameter in the attention model is obtained based on back propagation training of the relevancy.

After the foregoing processing of acquiring the text feature data and the local image feature data, a text feature vector Uk corresponding to a category label k of the original image and an image feature vector Vj corresponding to the $j^{th}$ local block in the original image may be obtained. Final text and image features may be denoted as Uk and Vj. In this example embodiment, the result of the inner product operation may be used to measure image-text relevancy or similarity, or relevancy between the local block and the category label. Specifically, the relevancy S between the $j^{th}$ local block and the category label is:

$$S=Uk \cdot Vj$$

In weight calculation processing of the attention model, each local image feature vector Vj is subject to an inner product operation with the text feature vector Uk of the original image. Each operation may generate a score. The score may describe a degree of matching between a certain local block and the category label, or may be interpreted as describing a probability that a certain block belongs to part or all of an object in the original image.

In an example, the search text is "khaki suit", and a corresponding clicked image is P1. After pre-processing, a category label of the clicked image P1 is "suit", wherein the clicked image P1 is converted into a training image P2 with 224*224 pixels. By taking 32*32 pixels as a local block of the training image P2, the training image P2 is divided into 49 local blocks. An image feature vector Vj of each local block is calculated, where j is in the range of [1, 49]. Meanwhile, a text feature vector Uk is formed after word embedding is performed on the category label "suit". An inner product of the image feature vector Vi and the text feature vector Uk is calculated to obtain a weight of each of the 49 local blocks belonging to a "suit" object area. A greater result value of the inner product calculation may represent a higher probability that the corresponding local block belongs to the "suit" object area.

In order to determine the relevancy between the text feature vector and the image feature vector, the relevancy may be represented by a Euclidean distance. Specifically, both the text feature vector and the image feature vector may be represented by using vectors, that is, in the same vector space, relevancy between two feature vectors may be determined by calculating a Euclidean distance between the two feature vectors.

Specifically, the relevancy between the text feature vector and the image feature vector may be a Euclidean distance between two vectors. A smaller value of the Euclidean distance obtained by calculation based on the two vectors may indicate a higher degree of matching between the two vectors; on the contrary, a greater value of the Euclidean distance obtained by calculation based on the two vectors may indicate a lower degree of matching between the two vectors.

In an implementation manner, the Euclidean distance between the text feature vector and the image feature vector may be calculated. A smaller Euclidean distance indicates higher relevancy between the two vectors, and a greater Euclidean distance indicates lower relevancy between the two vectors. Therefore, during model training, the Euclidean distance may be used as a training target. Correspondingly, during determination of relevancy, the text feature vector and the image feature vector may be subject to L2norm processing, and the image-text relevancy may be determined based on the Euclidean distance.

In the foregoing description, the relevancy between the image feature vector and the text feature vector is measured only by using the Euclidean distance. In an actual implementation, the relevancy between the image feature vector and the text feature vector may also be determined in other manners, for example, a cosine distance, a Manhattan distance, and the like. In addition, the relevancy may or may not be a numerical value in some cases. For example, the relevancy may be merely a character representation of a degree or trend. In this case, content of the character representation may be quantified to a particular value based on a preset rule. Hence, relevancy between two vectors may be determined subsequently by using the quantified value. The relevancy between two vectors in the example embodiment of the present disclosure is not limited to the foregoing description.

In the solution of this example embodiment, a sample image for training may be normalized into an intermediate image with a size of 224*224 pixels, then forward processing is carried out by using ResNet-152, and a feature at a res5c layer is used as a network output. As such, the size at an output layer is 2048×7×7, that is, image feature data of 7×7=49 local blocks of the intermediate image is output. Model parameters of an image-text matching relationship are learned and trained with reference to the text feature data of the image to obtain values of some specified parameters in the attention model. Through training of a weight parameter in the attention model, it is unnecessary to manually mark numerous images that require image object localization during an online application, thus saving a large amount of manual processing and significantly improving processing efficiency of image object area localization.

After the training is finished, in an actual online image object localization application, text information of the image is no longer needed. After a to-be-identified original image is input, the to-be-identified original image is also normalized into an intermediate image of the foregoing size. Data representing local area features of the image is obtained after image feature data of each local block in the original image is calculated. The data is inputted to an attention model that is constructed in advance through training, and weight distribution data of the intermediate image may be obtained by calculation. A location area of an object in the original image may be localized based on the weight distribution data. Certainly, in other example embodiments of the present disclosure, a weight distribution map of the intermediate image may also be calculated according to the image feature data in other manners, for example, a probability of a local block belonging to the object area is judged based on RGB channel information data of pixels in the local block, or a probability of whether a local block belongs to part or all of an object is determined according to grayscales of the image, color gradations of the image, relevance between pixels in adjacent local blocks, and so on.

Figure 3:
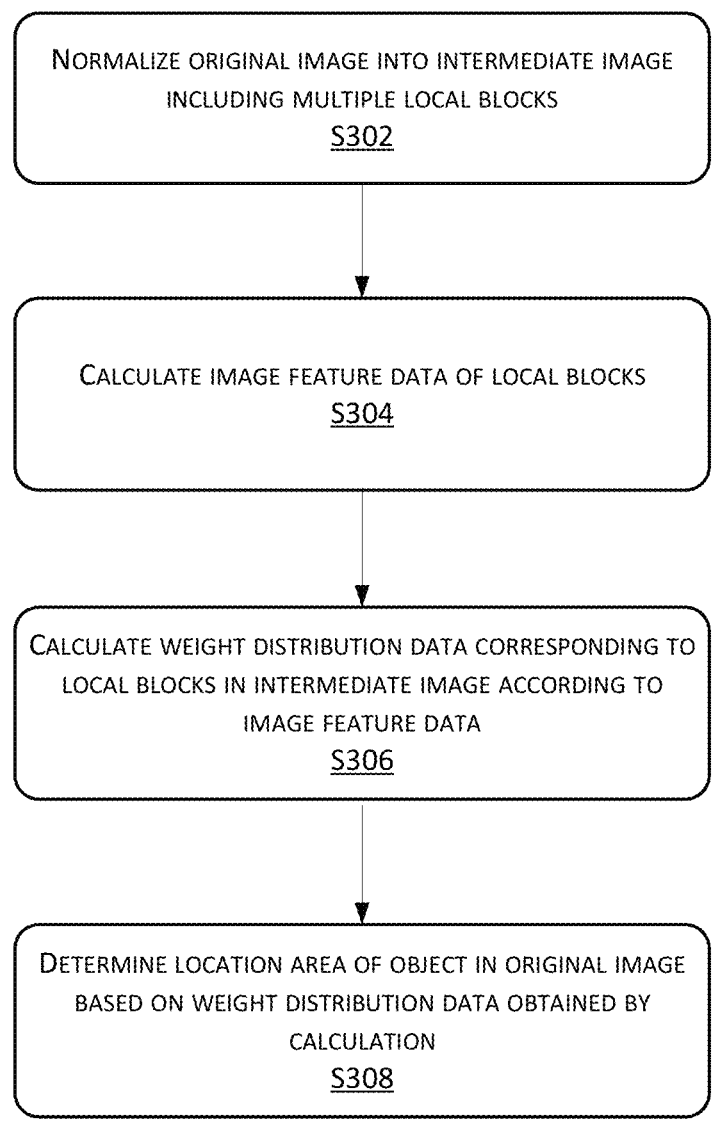
FIG. 3 is a schematic flowchart of an example embodiment of an image object localization method according to this present disclosure.

FIG. 3 is a schematic flowchart of an example embodiment of an image object localization method according to this present disclosure. A specific example embodiment is as shown in FIG. 3, and the method may include the following steps:

S302: An original image is normalized into an intermediate image, the intermediate image including multiple local blocks.

S304: Image feature data of the local blocks is calculated.

S306: Weight distribution data corresponding to the local blocks in the intermediate image is calculated according to the image feature data. The weight distribution data representing a degree of possibility that the local blocks include part or all of an object.

S308: A location area of the object in the original image is determined based on the weight distribution data obtained by calculation.

In an implementation scenario of an online application, some pre-processing in a predetermined manner may be performed on an original image to extract image feature data of local blocks of the original image. Then, the image feature data of each local block may be separately inputted to a pre-constructed attention model, and corresponding weights (the calculated weights here may be probability values) may be assigned to different local blocks through processing by the attention model to obtain weight distribution data corresponding to the local blocks. The weight distribution data may be used to generate the weight distribution map. In the example embodiment of the present disclosure, the attention model obtained through training is used to process the image feature data, and the weight distribution data of the intermediate image is outputted, thus determining a location area of a subject in the image, which is an image processing mechanism that may better express image content. Moreover, in one or more implementation manners using the attention model of this present disclosure, it is feasible to only train weight distribution {αi} of different local blocks. Therefore, the training process of the image object localization model in an early stage is not complex, has a small amount of computation, and facilitates rapid application extension.

After the weight distribution map is obtained, localization of an object in an image may implemented by using the weight distribution map. In some example embodiments of the present disclosure, as the weight distribution data is obtained based on a normalized image of the original image, the weight distribution data may be used to generate a weight distribution map according to locations of the corresponding local blocks in the intermediate image. During localization of the object in the original image, the weight distribution map may be restored to a size of the original image. There may be many specific implementation manners for restoring the weight distribution map to the size of the original image, for example, a linear interpolation algorithm, a bicubic interpolation algorithm, and the like. The weight distribution map restored to the size of the original image retains weight distribution data information of each local block. Therefore, localization of the object in the image may be implemented based on the weight distribution map after the restoration. In an example embodiment provided by the present disclosure, the step S308 may include the following steps:

A: A weight distribution map corresponding to the weight distribution data is determined according to corresponding locations of the local blocks in the intermediate image.

B: The weight distribution map is restored to a size of the original image by using a linear interpolation algorithm.

C: A first area corresponding to a weight value greater than a preset threshold is selected in the restored weight distribution map.

D: The location area of the localized object in the original image is determined based on a second area which is in the original image and corresponding to the first area.

Each local block in the intermediate image corresponds to one area location of the intermediate image, and the area location corresponds to one weight value. If a drawing of weight data is made according to location distribution of the local blocks in the intermediate image, a weight distribution map may be obtained. The size of the weight distribution map may be the same as or different from the size of the intermediate image. The step of selecting a first area corresponding to a weight value greater than a preset threshold may include: setting a threshold Y, and if a weight value of a local block is greater than Y, it may be considered that the local block includes part or all of an object and belongs to an object area in the original image. Certainly, the selecting may also be implemented in other manners. In an example, each local block in the intermediate image is an area with 32*32 pixels, and the 32*32 local block corresponds to a weight value. These weight values may be used to generate a weight distribution map. The weight distribution map may be restored to a size of the original image. Each weight value in the weight distribution map may be set to a different color or different shades of the same color according to the magnitude of the value. As such, each local block may have a corresponding color according to the weight value. Finally, colors corresponding to all the weight values are filled correspondingly, so that a heat map of an object area in the original image may be obtained. A heat concentrated part of the heat map represents an object area. According to the heat map, bounding box information of the object may be obtained by setting a threshold of pixel attribute values, thus localizing an area location of the object in the original image.

Figure 4:
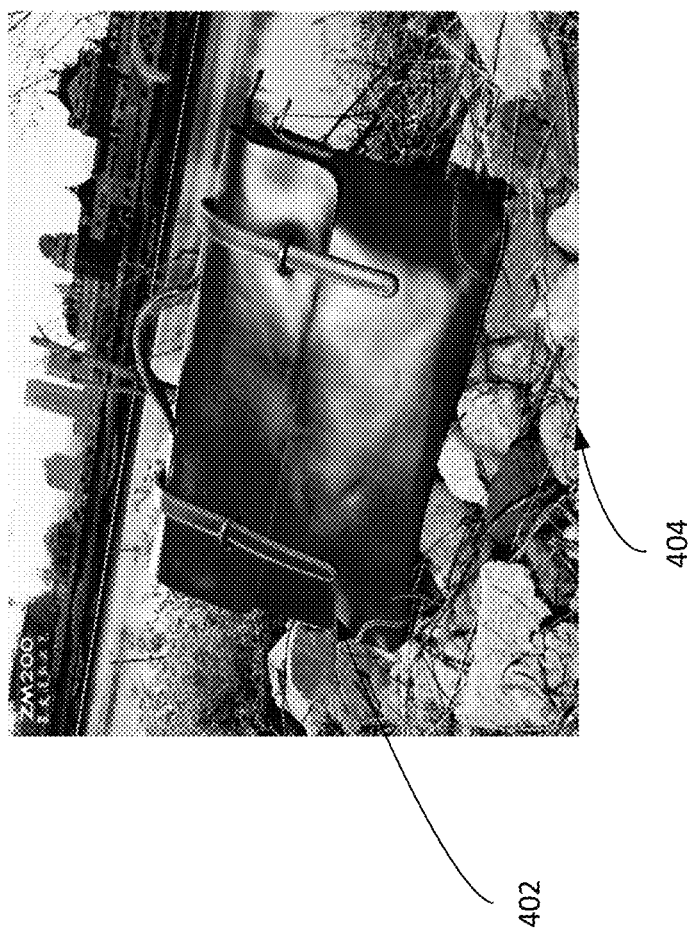
FIG. 4 is a to-be-processed original image in an online application scenario according to the present disclosure.
Figure 5:
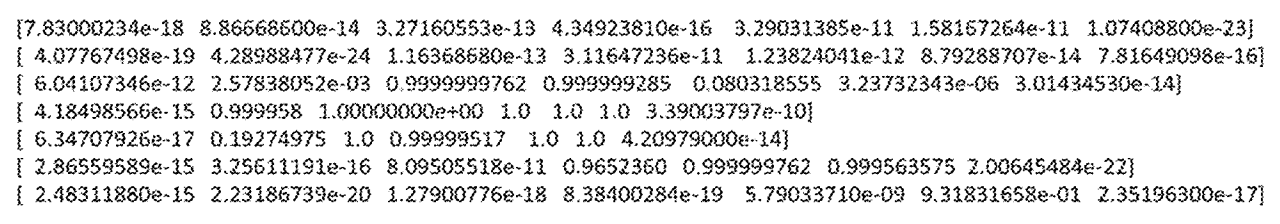

In a specific online application example, by using an object image of a leather bag product 402 in a leather bag image 404 shown in FIG. 4 as an example, the original image has a size of 800*800 pixels, and ResNet-152 may be used as a neural network model for image feature extraction. The leather bag image 404 is normalized into an intermediate image with 224*224 pixels, and then the intermediate image is used as an input of the ResNet-152 neural network model. A feature at a res5c layer is used as a network output, and image feature data of 7*7=49 local blocks is outputted. Each piece of image feature data in the image feature data of the 49 local blocks corresponds to a local image area with 32*32 pixels in the intermediate image. Then, weight distribution data of each local block is obtained by calculation according to the image feature data as shown in FIG. 5.

Figure 6:
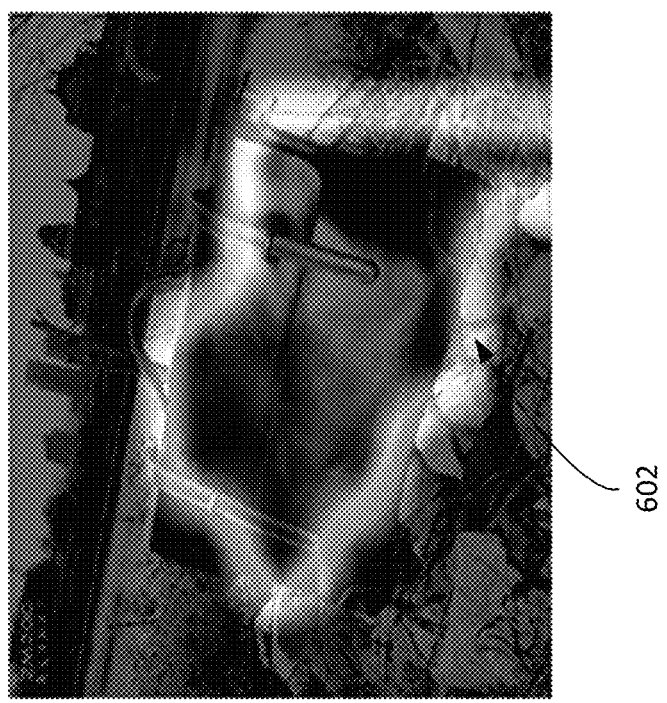
FIG. 6 is a heat map corresponding to a weight distribution map restored by linear interpolation according to the present disclosure.
Figure 7:
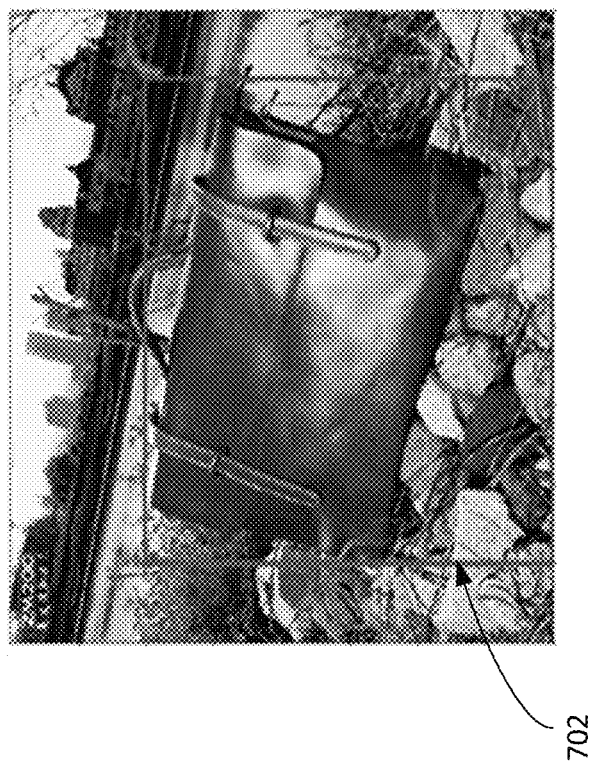
FIG. 7 is a schematic diagram of a subject location localized in the original image according to the heat map in FIG. 6 in the present disclosure.

Each piece of feature data is a data set of 2048 dimensions, and may be recorded as $\{\alpha^n\}_{n=1}^{N=49}$, wherein a greater value of each weight may represent a high probability that the corresponding local block belongs to the leather bag commodity object area. The weight distribution data of the 7*7=49 local blocks is used to generate a weight distribution map according to locations of the local blocks, and the weight distribution map is resized to a size of the original image, i.e., 800*800 pixels, by using linear interpolation. By assigning different colors to different weights, the heat map 602 of the object area as shown in FIG. 6 is obtained. Based on the heat map 602 shown by the dashed box in FIG. 6, bounding box information of the object may be obtained by setting a threshold of pixel attribute values, as shown in FIG. 7. As such, the leather bag product object may be localized in the leather bag original image. A rectangular box 702 in FIG. 7 is a subject location area of the leather bag object localized.

The image processing method and the processing device provided in the example embodiments of this application may localize a subject in an image rapidly and efficiently, thus saving a large amount of work for labeling images manually.

Figure 8:
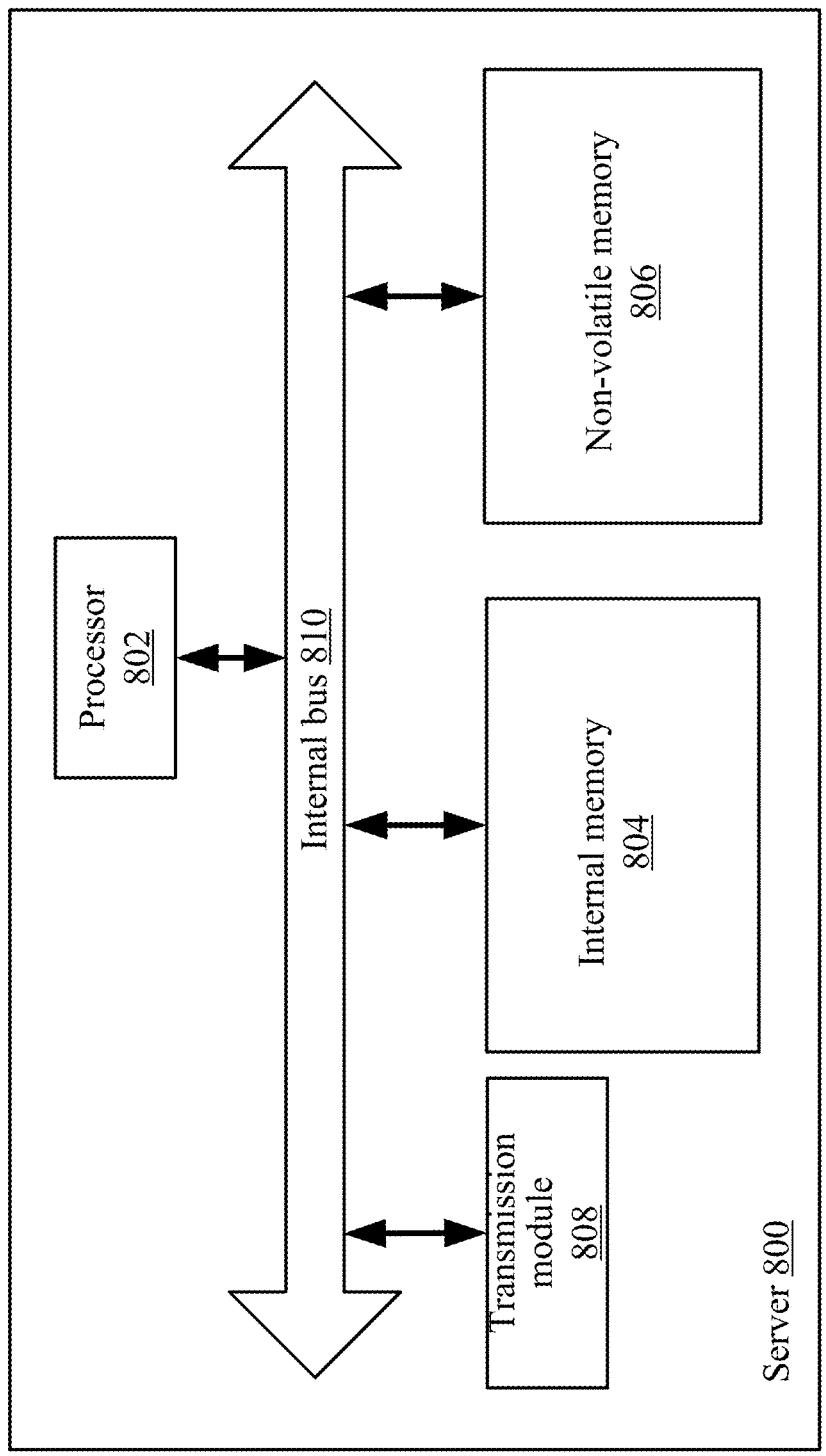
FIG. 8 is a schematic architectural diagram of a server according to the present disclosure.

The method example embodiment provided in the example embodiments of the present disclosure may be executed in a mobile terminal, a computer terminal or a similar arithmetic unit. Using the method run on a server as an example, FIG. 8 is a structural block diagram of hardware of a server of a search method according to an example embodiment of the present disclosure. As shown in FIG. 8, a server 800 may include one or more (only one is shown) processors 802 (where the processor 802 may include, but is not limited to, processing apparatus such as a micro controller unit (MCU) or programmable logic device FPGA), computer readable media configured to store data including internal memory 804 and non-volatile memory 806, and a transmission module 808 configured to provide a communication function. The processor 802, the internal memory 804, the non-volatile memory 806, and the transmission module 808 are connected via internal bus 810.

It should be understood by those of ordinary skill in the art that the structure shown in FIG. 6 is merely schematic and does not constitute any limitation to the structure of the above electronic apparatus. For example, the server 800 may include more or fewer components than those shown in FIG. 8 or may have a configuration different from that shown in FIG. 8.

The computer readable media may be configured to store a software program and module of application software, for example, program instructions and modules corresponding to the search method in the example embodiments of the present disclosure. The processor 802 runs the software program and module stored in the computer readable media to execute various functional applications and data processing, that is, implement the above search method. The computer readable media may include a high-speed random access memory, and may also include a non-volatile memory such as one or more magnetic storage devices, flash memory, or other non-volatile solid state memory. In some examples, the computer readable media may further include memories remotely disposed relative to the processor 802. The remote memories may be connected to the server 800 through a network. Examples of the network include, but are not limited to, the Internet, an enterprise intranet, a local area network, a mobile communication networks, and combinations thereof.

The transmission module 808 is configured to receive or send data through a network. Specific examples of the network may include a wireless network provided by a communication provider. In an example, the transmission module 808 includes a Network Interface Controller (NIC), which may be connected to other network devices through a base station so as to communicate with the Internet. In an example, the transmission module 808 may be a Radio Frequency (RF) module configured to wirelessly communicate with the Internet.

Based on the foregoing image object localization method, this present disclosure further provides a processing device for image object localization. The processing device may include a system (including a distributed system), software (application), a module, a component, a server, a client terminal and the like using the method in the example embodiment of this application and is combined with a device having necessary implementation hardware. Based on the same innovative idea, a processing apparatus in an example embodiment provided in this present disclosure is as described in the following example embodiment. As an implementation solution used in the apparatus to solve the problem is the same as that of the method, for the specific implementation of the processing apparatus in the example embodiment of this present disclosure, reference may be made to the implementation of the foregoing method; repeated parts are not described in detail again. Although the apparatus described in the following example embodiment is preferably implemented by software, the implementation based on hardware or a combination of software and hardware is also possible and conceivable.

The image object localization method provided in the example embodiment of this present disclosure may be implemented in a computer by a processor executing a corresponding program instruction, for example, implemented on a PC end by using the c++ language of the windows operating system, or implemented by using application design languages corresponding to other operating systems such as Linux, android, and iOS in combination with necessary hardware, or implemented based on processing logic of a quantum computer. Specifically, in an example embodiment of a processing apparatus provided in this present disclosure, the processing apparatus may include a processor and a memory configured to store computer-readable instructions. The processor implements the following steps when executing the instruction:

normalizing an original image into an intermediate image, the intermediate image including multiple local blocks;

calculating image feature data of the local blocks;

calculating weight distribution data corresponding to the local blocks in the intermediate image according to the image feature data, the weight distribution data representing a degree of possibility that the local blocks include part or all of an object; and determining a location area of the object in the original image based on the weight distribution data obtained by calculation.

In an implementation manner, the processor implements the following operation when calculating the weight distribution data corresponding to the local blocks in the intermediate image: processing the image feature data by using an attention model, and outputting the weight distribution data corresponding to the local blocks in the intermediate image.

In an implementation manner, the attention model used by the processor is constructed through the following steps:

acquiring training data, the training data including: search text and a clicked image related to a click behavior that occurs based on the search text;

calculating text feature data of the clicked image according to a category label of the clicked image, the category label being obtained based on the search text corresponding to the clicked image;

normalizing the clicked image into a training image, the training image including multiple local blocks;

extracting local image feature data of the local blocks; and learning and training an image-text matching relationship based on the text feature data and the local image feature data, until attention model parameters meeting a preset threshold condition are obtained.

In an implementation manner, in the process of the processor learning and training the model parameters of the image-text matching relationship, a result of an inner product operation on the text feature data and the local image feature data is used to represent relevancy between the local block and the category label; and a value of a designated matrix parameter in the attention model is obtained based on back propagation training of the relevancy.

It should be noted that the foregoing apparatus in the example embodiment of this present disclosure may further include other implementation manners according to the description in the related method example embodiment. For example, the text feature data processed by the processor includes: a dense vector into which the category label is converted through word embedding. For a specific implementation manner, reference may be made to the description in the method example embodiment, and details are not described here again.

Various example embodiments in this present disclosure are described in a progressive manner. The same or similar parts between the example embodiments may be referenced to one another. In each example embodiment, the part that is different from other example embodiments is mainly described. Particularly, an example embodiment combining hardware and a program is described in a relatively simple manner because it is similar to the method example embodiment, and for related parts, reference may be made to the partial description in the method example embodiment.

The specific example embodiments of this present disclosure are described above. Other example embodiments are in the scope of the appended claims. In some cases, the actions or steps recorded in the claims may still achieve an anticipated result when being executed in a sequence different from that in the example embodiment. In addition, the process depicted in the drawings does not necessarily require the shown particular sequence or a consecutive sequence to achieve an anticipated result. In some implementation manners, multi-task processing and parallel processing are also allowed or may be beneficial.

An image object localization apparatus provided by the example embodiment of this present disclosure may normalize an original image and then extract and calculate local feature data to acquire weight distribution data of each local block. A weight in the weight distribution data may represent a degree of possibility that a corresponding local block belongs to an object area. After the weight distribution data is acquired, a location area of an object in the original image may be determined by using the weight distribution data, and an object bounding box is marked in the original image. In the processing of localizing a location area of an object in an image, the implementation solution provided in this present disclosure may save a large amount of work for manual labeling and data processing on images, thus localizing an object in an image rapidly and efficiently.

It may be learned from the foregoing description that the technical solution of calculating weight distribution data in an image may also be implemented independently. Therefore, the present disclosure further provides an image processing method. The method includes:

acquiring an image including multiple local blocks;

calculating image feature data of the local blocks; and processing the image feature data by using an attention model, and outputting weight distribution data corresponding to the local blocks, the weight distribution data representing a degree of possibility that the local blocks include part or all of an object.

The present disclosure further provides one or more computer readable media storing computer-readable instructions that, when executed by one or more processors, cause the one or more processors to implement the steps in any of the method embodiments of this present disclosure.

The computer readable medium may include a physical apparatus configured to store information. The information may be stored by using electrical media, magnetic media, optical media or the like after being digitalized. The computer readable medium in this example embodiment may include: an apparatus that stores information by using electrical energy, e.g., various memories such as a RAM and a ROM; an apparatus that stores information by using magnetic energy, e.g., a hard disk, a floppy disk, a magnetic tape, a magnetic core memory, a magnetic bubble memory, and a USB flash drive; an apparatus that stores information optically, e.g., a CD or a DVD. Certainly, there may be other types of readable storage media, such as a quantum memory, a graphene memory, or the like.

It should be noted that the foregoing computer readable medium may further include other implementation manners according to the description of the method or apparatus example embodiment. For the specific implementation manner, reference may be made to the description of the method example embodiment, and details are not described here again.

Although the present disclosure provides the operation steps of the method as described in the example embodiments or shown in the flowcharts, more or fewer operation steps may be included based on conventional or non-creative efforts. The step sequence listed in the example embodiments is merely one of many step execution sequences and does not represent a unique execution sequence. During execution by an actual apparatus or client terminal product, the steps may be executed according to the method sequence described in the example embodiments or shown in the accompanying drawings or may be executed in parallel (for example, in a parallel processor or multi-thread processing environment).

The content of the example embodiments of this present disclosure mentions converting one-hot codes into a lower-dimension dense vector through an Embedding Layer, extracting a local image feature by using ResNet-152, using a feature at a res5c layer as a network output, calculating a distance between image and text vectors by using an Euclidean distance, as well as description about data acquisition, vector coding, interaction, calculation, judgment and so on based on the attention model formula and the like disclosed in the example embodiments. However, the example embodiments of this present disclosure are not necessarily limited to meeting an industry communication standard, a standard image data processing protocol, a network model, a vector coding rule and a neural network standard model or the situations described in the example embodiments of this present disclosure. Implementation solutions slightly modified based on some industry standards, or using self-defined manners, or based on the implementation described in the example embodiments may also achieve implementation effects the same as, equivalent to, or similar to the foregoing example embodiments, or achieve predictable implementation effects after transformation. Example embodiments obtained after the modified or transformed data acquisition, storage, judgment, and processing manners are applied may still belong to the scope of the optional implementation solutions of this present disclosure.

In the 1990s, an improvement on a technology may be obviously distinguished as an improvement on hardware (e.g., an improvement on a circuit structure such as a diode, a transistor, and a switch) or an improvement on software (an improvement on a method procedure). However, with the development of technologies, improvements of many method procedures at present may be considered as direct improvements on hardware circuit structures. Almost all designers program the improved method procedures into hardware circuits to obtain corresponding hardware circuit structures. Therefore, it is improper to assume that the improvement of a method procedure cannot be implemented by using a hardware entity module. For example, a Programmable Logic Device (PLD) (e.g., a Field Programmable Gate Array (FPGA)) is such an integrated circuit, and its logic functions are determined by a user programming devices. Designers program by themselves to "integrate" a digital system into a PLD, without asking a chip manufacturer to design and manufacture a dedicated integrated circuit chip. Moreover, at present, the programming is mostly implemented by using logic compiler software, instead of manually manufacturing an integrated circuit chip. The logic compiler software is similar to a software complier used for developing and writing a program, and original codes before compiling also need to be written by using a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art should also know that a hardware circuit for implementing the logic method procedure may be easily obtained by slightly logically programming the method procedure using the above several hardware description languages and programming it into an integrated circuit.

A controller may be implemented in any suitable manner. For example, the controller may employ a form of a microprocessor or a processor and a computer readable medium that stores computer readable program codes (such as software or firmware) executable by the microprocessor or processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The controller of the memory may further be implemented as a part of control logic of the memory. Those skilled in the art also know that in addition to implementing the controller by using pure computer readable program codes, it is completely feasible to logically program the method steps to enable the controller to implement the same function in a form of a logic gate, a switch, an ASIC, a programmable logic controller and an embedded microcontroller. Therefore, such a controller may be considered as a hardware component, and apparatuses included in the controller and configured to implement various functions may also be considered as structures inside the hardware component. Or, the apparatuses configured to implement various functions may even be considered as both software modules configured to implement the method and structures inside the hardware component.

The system, apparatus, modules or units illustrated in the foregoing example embodiments specifically may be implemented by a computer chip or an entity or implemented by a product having a specific function. A typical implementation device is a computer. Specifically, for example, the computer may be a personal computer, a laptop computer, a vehicle-mounted man-machine interaction device, a cellular phone, a camera phone, a smart phone, a personal digital assistant, a media player, a navigation device, an email device, a game console, a tablet computer, a wearable device, or a combination of any of these devices.

Although the example embodiments in this present disclosure provide the operation steps of the method as described in example embodiments or shown in the flowcharts, more or fewer operation steps may be included based on conventional or non-creative measures. The step sequence listed in the example embodiments is merely one of many step execution sequences and does not represent a unique execution sequence. During execution by an actual apparatus or client terminal product, the steps may be executed according to the method sequence described in the example embodiments or shown in the accompanying drawings or may be executed in parallel (for example, in a parallel processor or multi-thread processing environment, or even in a distributed data processing environment). The terms "include" and "comprise" as well as their any other variations are intended to cover non-exclusive inclusion, so that a process, method, product or device including a series of elements not only includes the elements clearly listed, but also may include other elements not clearly listed or elements inherent to the process, method, product or device. Without more restrictions, other identical or equivalent elements may also exist in the process, method, product or device including the elements.

For ease of description, the apparatus is divided into various modules based on functions, and the modules are described separately. Certainly, in an implementation manner of the example embodiments of this present disclosure, functions of various modules may also be implemented in one or more pieces of software and/or hardware, or a module implementing the same function may be implemented by a combination of multiple sub-modules or sub-units. The apparatus example embodiment described above is merely schematic. For example, the division of the units is merely logical function division, and there may be other division manners in an actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in an electric form, a mechanical form, or other forms.

Those skilled in the art also know that in addition to implementing the controller by using pure computer readable program codes, it is completely feasible to logically program the method steps to enable the controller to implement the same function in a form of a logic gate, a switch, an ASIC, a programmable logic controller and an embedded microcontroller. Therefore, such a controller may be considered as a hardware component, and apparatuses included in the controller and configured to implement various functions may also be considered as structures inside the hardware component. Or, the apparatuses configured to implement various functions may even be considered as both software modules configured to implement the method and structures inside the hardware component.

The present disclosure is described with reference to flowcharts and/or block diagrams of the method, device (system) and computer program product according to the example embodiments of the present disclosure. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of another programmable data processing device generate an apparatus configured to implement a specified function in one or more processes in the flowcharts and/or in one or more blocks in the block diagrams.

These computer program instructions may also be stored in a computer readable memory that may instruct a computer or another programmable data processing device to work in a particular manner, such that the instructions stored in the computer readable memory generate an article of manufacture that includes an instruction apparatus. The instruction apparatus implements a function specified in one or more processes in the flowcharts and/or in one or more blocks in the block diagrams.

These computer program instructions may also be loaded onto a computer or another programmable data processing device, such that a series of operation steps are performed on the computer or another programmable device, thus generating computer-implemented processing. Therefore, the instructions executed on the computer or another programmable device provide steps for implementing a function specified in one or more processes in the flowcharts and/or in one or more blocks in the block diagrams.

In atypical configuration, the computing device includes one or more central processing units (CPUs), an input/output interface, a network interface, and computer readable media.

The memory is an example of computer readable media such as a volatile memory, a Random Access Memory (RAM), and/or non-volatile memory, e.g., a Read-Only Memory (ROM) or a flash RAM.

The computer readable medium includes non-volatile and volatile media as well as movable and non-movable media and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

Those skilled in the art should understand that the example embodiments of this present disclosure may be provided as a method, a system, or a computer program product. Therefore, the example embodiments of this present disclosure may be implemented in a form of a complete hardware example embodiment, a complete software example embodiment, or an example embodiment combining software and hardware. Moreover, the example embodiments of this present disclosure may be in the form of a computer program product implemented on one or more computer usable storage media (including, but not limited to, a magnetic disk memory, a CD-ROM, an optical memory and the like) including computer usable program codes.

The example embodiments of this present disclosure may be described in a general context of a computer executable instruction executed by a computer, for example, a program module. Generally, the program module includes a routine, a program, an object, an assembly, a data structure, and the like used for executing a specific task or implementing a specific abstract data type. The example embodiments of this present disclosure may also be implemented in distributed computing environments. In the distributed computing environments, a task is executed by using remote processing devices connected through a communications network. In the distributed computing environments, the program module may be located in local and remote computer storage media including a storage device.

Various example embodiments in this present disclosure are described in a progressive manner. The same or similar parts between the example embodiments may be referenced to one another. In each example embodiment, the part that is different from other example embodiments is mainly described. Particularly, the system example embodiment is described in a relatively simple manner because it is similar to the method example embodiment, and for related parts, reference may be made to the partial description in the method example embodiment. In the description in this present disclosure, the description with reference to the term "one example embodiment", "some example embodiments", "example", "specific example" or "some examples" means that a specific feature, structure, material or characteristic described in the example embodiment or example is included in at least one example embodiment or example in the example embodiments of this present disclosure. In this present disclosure, the schematic expression of the foregoing term is not necessarily directed to the same example embodiment or example. Moreover, the described specific feature, structure, material or characteristic may be combined in a proper manner in any one or more example embodiments or examples. In addition, those skilled in the art may integrate and combine different example embodiments or examples and features of the different example embodiments or examples described in this present disclosure as long as there is no contradiction.

The above description is merely example embodiments of the example embodiments of this present disclosure and is not used to limit the example embodiments of this present disclosure. For those skilled in the art, the example embodiments of this present disclosure may have various alterations and changes. Any modification, equivalent replacement, improvement and the like made without departing from the spirit and principle of the example embodiments of this present disclosure should be included in the scope of the claims of the example embodiments of this present disclosure.

The present disclosure may further be understood with clauses as follows.

Clause 1. An image processing method comprising:

normalizing an original image into an intermediate image, the intermediate image comprising multiple local blocks;

calculating image feature data of the local blocks;

calculating weight distribution data corresponding to the local blocks in the intermediate image according to the image feature data, the weight distribution data representing a degree of possibility that the local blocks comprise part or all of an object; and determining a location area of the object in the original image based on the weight distribution data obtained by calculation.

Clause 2. The method of clause 1, wherein the step of calculating weight distribution data corresponding to the local blocks in the intermediate image comprises:

processing the image feature data by using an attention model, and outputting the weight distribution data corresponding to the local blocks in the intermediate image.

Clause 3. The method of clause 2, wherein the attention model is trained by using user search behavior data.

Clause 4. The method of clause 3, wherein the training comprises:

acquiring training data, the training data comprising: search text and a clicked image related to a click behavior that occurs based on the search text;

calculating text feature data of the clicked image according to a category label of the clicked image, the category label being obtained based on the search text corresponding to the clicked image;

normalizing the clicked image into a training image, the training image comprising multiple local blocks;

extracting local image feature data of the local blocks; and learning and training an image-text matching relationship based on the text feature data and the local image feature data, until attention model parameters meeting a preset threshold condition are obtained.

Clause 5. The method of clause 4, wherein in the process of learning and training the model parameters of the image-text matching relationship, a result of an inner product operation on the text feature data and the local image feature data is used to represent relevancy between the local block and the category label; and a value of a designated matrix parameter in the attention model is obtained based on back propagation training of the relevancy.

Clause 6. The method of clause 4, wherein the text feature data comprises a dense vector into which the category label is converted through word embedding.

Clause 7. The method of clause 1, wherein the image feature data comprises data representing image feature information in image blocks and outputted after image feature extraction is performed on the image blocks through a neural network model.

Clause 8. The method of clause 1, wherein the step of determining a location area of the object in the original image based on the weight distribution data obtained by calculation comprises:

obtaining a weight distribution map corresponding to the weight distribution data according to corresponding locations of the local blocks in the intermediate image;

restoring the weight distribution map to a size of the original image by using a linear interpolation algorithm;

selecting, in the restored weight distribution map, a first area corresponding to a weight value greater than a preset threshold; and determining the location area of the localized object in the original image based on a second area which is in the original image and corresponding to the first area.

Clause 9. A processing device, comprising a processor and a memory configured to store computer-readable instructions, the processor implementing the following operations when executing the instruction:

normalizing an original image into an intermediate image, the intermediate image comprising multiple local blocks;

calculating image feature data of the local blocks;

calculating weight distribution data corresponding to the local blocks in the intermediate image according to the image feature data, the weight distribution data representing a degree of possibility that the local blocks comprise part or all of an object; and determining a location area of the object in the original image based on the weight distribution data obtained by calculation.

Clause 10. The processing device of clause 9, wherein the processor implements the following operation when calculating the weight distribution data corresponding to the local blocks in the intermediate image:

processing the image feature data by using an attention model, and outputting the weight distribution data corresponding to the local blocks in the intermediate image.

Clause 11. The processing device of clause 10, wherein the attention model used in the processor is trained by using user search behavior data.

Clause 12. The processing device of clause 11, wherein the training performed by the processor on the attention model comprises:

acquiring training data, the training data comprising: search text and a clicked image related to a click behavior that occurs based on the search text;

calculating text feature data of the clicked image according to a category label of the clicked image, wherein the category label is obtained based on the search text corresponding to the clicked image;

normalizing the clicked image into a training image, the training image comprising multiple local blocks;

extracting local image feature data of the local blocks; and learning and training an image-text matching relationship based on the text feature data and the local image feature data, until attention model parameters meeting a preset threshold condition are obtained.

Clause 13. The processing device of clause 12, wherein in the process of learning and training the model parameters of the image-text matching relationship executed by the processor, a result of an inner product operation on the text feature data and the local image feature data is used to represent relevancy between the local block and the category label; and a value of a designated matrix parameter in the attention model is obtained based on back propagation training of the relevancy.

Clause 14. The processing device of clause 12, wherein the text feature data processed by the processor comprises a dense vector into which the category label is converted through word embedding.

Clause 15. The processing device of clause 9, wherein the image feature data processed by the processor comprises data representing image feature information in image blocks and outputted after image feature extraction is performed on the image blocks through a neural network model.

Clause 16. The processing device of clause 9, wherein the processor determining a location area of the object in the original image based on the weight distribution data obtained by calculation comprises:
    obtaining a weight distribution map corresponding to the weight distribution data according to corresponding locations of the local blocks in the intermediate image;
    restoring the weight distribution map to a size of the original image by using a linear interpolation algorithm;
    selecting, in the restored weight distribution map, a first area corresponding to a weight value greater than a preset threshold; and
    determining the location area of the localized object in the original image based on a second area which is in the original image and corresponding to the first area.

Clause 17. An image processing method comprising:
    acquiring an image comprising multiple local blocks;
    calculating image feature data of the local blocks; and
    processing the image feature data by using an attention model, and outputting weight distribution data corresponding to the local blocks, the weight distribution data representing a degree of possibility that the local blocks comprise part or all of an object.

Clause 18. One or more computer readable media storing therein computer-readable instructions that, wherein when being executed, cause one or more processor to implement the steps of the method according to any of clauses 1 to 8.

What is claimed is:

1. A method comprising:
    training an attention model by:
        acquiring training data, the training data including a search text and a clicked image related to a click behavior that occurs based on the search text;
        calculating text feature data of the clicked image according to a category label of the clicked image, the category label being obtained based on the search text corresponding to the clicked image;
        normalizing the clicked image into a training image, the training image including multiple local blocks of the training image;
        extracting local image feature data of the multiple local blocks; and
        learning and training an image-text matching relationship based on the text feature data and the local image feature data, until obtaining attention model parameters that meet a preset threshold condition.

2. The method of claim 1 further comprising:
    normalizing an original image into an intermediate image, the intermediate image including multiple local blocks;
    calculating respective image feature data of a respective local block of the multiple local blocks by using the attention model;
    calculating respective weight distribution data corresponding to the respective local block according to the respective image feature data, the respective weight distribution data representing a degree of possibility that the respective local block includes part or all of an object; and
    determining a location area of the object in the original image based on the respective weight distribution data.

3. The method of claim 2, wherein the respective image feature data includes data representing image feature information in the respective image block that is output after image feature extraction is performed on the respective image block through a neural network model.

4. The method of claim 2, wherein the determining the location area of the object in the original image based on the respective weight distribution data includes:
    obtaining a weight distribution map corresponding to weight distribution data according to corresponding locations of the multiple local blocks in the intermediate image;
    restoring the weight distribution map to a size of the original image by using a linear interpolation algorithm;
    selecting, in a restored weight distribution map, a first area corresponding to a weight value greater than a preset threshold; and
    determining the location area of the object in the original image based on a second area in the original image that corresponds to the first area in the restored weight distribution map.

5. The method of claim 1, wherein the training data is associated with user search behavior data.

6. The method of claim 1, wherein the learning and training the image-text matching relationship includes:
    using a result of an inner product operation of the text feature data and the local image feature data to represent a relevancy between a respective local block of the training image and the category label; and
    obtaining a value of a designated matrix parameter in the attention model based on back propagation training of the relevancy.

7. The method of claim 1, wherein:
    the text feature data includes a dense vector; and
    the method further comprises converting the category label through word embedding to obtain the dense vector.

8. A device comprising:
    one or more processors; and
    one or more computer storage media storing thereon computer-readable instructions that, when executed by the one or more processors, cause the one or more processors to perform acts comprising:
        training an attention model by:
            acquiring training data, the training data including a search text and a clicked image related to a click behavior that occurs based on the search text;
            calculating text feature data of the clicked image according to a category label of the clicked image, the category label being obtained based on the search text corresponding to the clicked image;
            normalizing the clicked image into a training image, the training image including multiple local blocks of the training image;
            extracting local image feature data of the multiple local blocks; and
            learning and training an image-text matching relationship based on the text feature data and the local image feature data, until obtaining attention model parameters that meet a preset threshold condition.

9. The device of claim 8, wherein the acts further comprise:
    normalizing an original image into an intermediate image, the intermediate image including multiple local blocks;
    calculating respective image feature data of a respective local block of the multiple local blocks by using the attention model;
    calculating respective weight distribution data corresponding to the respective local block according to the respective image feature data, the respective weight distribution data representing a degree of possibility that the respective local block includes part or all of an object; and determining a location area of the object in the original image based on the respective weight distribution data.

10. The device of claim 9, wherein the respective image feature data includes data representing image feature information in the respective image block that is output after image feature extraction is performed on the respective image block through a neural network model.

11. The device of claim 9, wherein the determining the location area of the object in the original image based on the respective weight distribution data includes:

obtaining a weight distribution map corresponding to weight distribution data according to corresponding locations of the multiple local blocks in the intermediate image;

restoring the weight distribution map to a size of the original image by using a linear interpolation algorithm;

selecting, in a restored weight distribution map, a first area corresponding to a weight value greater than a preset threshold; and determining the location area of the object in the original image based on a second area in the original image that corresponds to the first area in the restored weight distribution map.

12. The device of claim 8, wherein the training data is associated with user search behavior data.

13. The device of claim 8, wherein the learning and training the image-text matching relationship includes:

using a result of an inner product operation of the text feature data and the local image feature data to represent a relevancy between a respective local block of the training image and the category label; and obtaining a value of a designated matrix parameter in the attention model based on back propagation training of the relevancy.

14. The device of claim 8, wherein:

the text feature data includes a dense vector; and the acts further comprise converting the category label through word embedding to obtain the dense vector.

15. One or more computer storage media storing thereon computer-readable instructions that, when executed by one or more processors, cause the one or more processors to perform acts comprising:

training an attention model by:

acquiring training data, the training data including a search text and a clicked image related to a click behavior that occurs based on the search text;

calculating text feature data of the clicked image according to a category label of the clicked image, the category label being obtained based on the search text corresponding to the clicked image;

normalizing the clicked image into a training image, the training image including multiple local blocks of the training image;

extracting local image feature data of the multiple local blocks; and learning and training an image-text matching relationship based on the text feature data and the local image feature data, until obtaining attention model parameters that meet a preset threshold condition.

16. The one or more computer storage media of claim 15, wherein the acts comprising further comprise:

acquiring an image;

dividing the image into multiple local blocks;

calculating image feature data of the multiple local blocks;

obtaining a weight distribution map corresponding to weight distribution data according to corresponding locations of the multiple local blocks by calculating the weight distribution data corresponding to the multiple local blocks by using the attention model;

restoring the weight distribution map to a size of the image;

selecting, in a restored weight distribution map, a first area corresponding to a weight value greater than a preset threshold; and determining a location area of an object in the image based on a second area in the image that corresponds to the first area in the restored weight distribution map.

17. The one or more computer storage media of claim 16, wherein the dividing the image into the multiple local blocks includes:

normalizing the image into an intermediate image, the intermediate image including the multiple local blocks.

18. The one or more computer storage media of claim 16, wherein the image feature data includes data representing image feature information in the multiple image blocks that is output after image feature extraction is performed on the multiple image blocks through a neural network model.

19. The one or more computer storage media of claim 15, wherein the training data is associated with user search behavior data.

20. The one or more computer storage media of claim 15, wherein the learning and training the image-text matching relationship includes:

using a result of an inner product operation of the text feature data and the local image feature data to represent a relevancy between a respective local block of the training image and the category label; and obtaining a value of a designated matrix parameter in the attention model based on back propagation training of the relevancy.

* * * * *